United States Patent [19]

Yoshida et al.

[11] 3,879,212

[45] Apr. 22, 1975

[54] PROCESS FOR THE PRODUCTION OF AMYLOSE FILMS

[75] Inventors: Mikohiko Yoshida; Mamoru Hirao, both of Okayama-ken, Japan

[73] Assignee: Hayashibara Company, Okayama, Japan

[22] Filed: Nov. 6, 1970

[21] Appl. No.: 87,575

[30] Foreign Application Priority Data

Nov. 9, 1969 Japan.............................. 44-89516
Dec. 10, 1969 Japan.............................. 44-99182

[52] U.S. Cl. .................................................. 106/213
[51] Int. Cl.. C08b 27/42; C08b 29/14; C08b 25/02
[58] Field of Search..................... 106/213; 195/31 R

[56] References Cited

UNITED STATES PATENTS

| 3,312,560 | 4/1967 | Walton | 106/213 |
| 3,532,602 | 10/1970 | Seidman | 195/31 R |
| 3,556,942 | 1/1971 | Hathaway | 195/31 R |
| 3,560,345 | 2/1971 | Yokobayashi | 195/31 R |

Primary Examiner—Theodore Morris
Attorney, Agent, or Firm—Browdy and Neimark

[57] ABSTRACT

The present invention relates to a process for the production of various films comprising linear chain amylose of various degrees of polymerization (D.P.), in which amylopectin is absent.

5 Claims, No Drawings

PROCESS FOR THE PRODUCTION OF AMYLOSE FILMS

The present invention relates to a process for the production of various films comprising linear chain amylose of various degrees of polymerization (D.P.), in which amylopectin is absent.

Films produced from amylose are receiving great attention recently as a material for food packaging or coating, because the products are characterized in that they are edible, water soluble, oil resistant, and having a low oxygen permeability, which are essential properties for food packaging. However the fact that the films are produced from amylomaize starch (amylomaize is a corn hybrid developed genetically, which contains 60– 80 % of amylose.) makes the film products expensive. In addition the transparency of films produced from amylomaize is very poor. Since the amylomaize starch itself is not pure amylose, and contains 20 – 40 % of amylopectin, full display of the characteristics of amylose is impossible, thus the films have low tensilities. With the objective to improve this point, the inventors have developed a process for the production of films by the utilization of pure amylose easily made from various starches. More particularly the inventors succeeded in the production of films by (a) decomposing amylopectin present in potato starch, sweet potato starch, corn starch and tapioca starch by the use of α-1,6-glucosidase into short chain amylose with D.P., 20 – 30, thus obtaining amylose mixtures consisting of various proportions of long chain amylose (D.P. over 100) and short chain amylose (D.P. less than 100), (b) removal of short chain amylose from the amylose mixture or blending two or more varieties of amylose mixtures in different proportions and then (c) producing many varieties of films with the long chain amylose or the amylose mixtures.

1. Mixed amylose with the ratio of long chain amylose portion (hereinafter long chain amylose with D.P. over 100 is represented by L.)/short chain amylose portion (hereinafter short chain amylose with D.P. under 100 is represented by S.), 50 : 50 – 70 : 30 is obtained by decomposing amylomaize starch with α-1,6-glucosidase to convert amylopectin present in the starch into linear chain amylose. With this method, starch can be converted into amylose completely and film properties are improved. But the ratio of L/S is fixed by the kind of raw starch used and it is impossible to change the ratio freely.

Accordingly the inventors evaluated methods to improve these disadvantages.

2. The amylose and amylopectin portions present in cereal starch, root and tuber starch or amylomaize starch are separated by usual methods, then the amylopectin portion is converted into linear chain amylose, thus amylose with a ratio of L:S = 9:1 is obtainable.

3. By converting potato or corn or amylomaize starch with α-1,6-glucosidase to obtain amylose with a L/S ratio of 70:30 – 25:75 and then by fractionating it into two portions of L and S, an amylose mixture with a L/S rato of 90:10 – 50:50 is obtainable. Accordingly amyloses with various L/S ratios are obtainable by mixing the three above mentioned amyloses. These amyloses were compared by forming them into films. Films containing over 50 % of S portion proved usable. Thus the production of films with different mechanical and physical properties, light transparency, water solubility, tensility, became possible. The points in which the present invention is characterized are listed as follows.

1. Because higher quality films compared to amylomaize films can be produced with amylose using common commercial starch, such as sweet potato starch, potato starch, tapioca starch and common corn starch, as basic material, the present invention provides processes for the production of film on a large scale and at popular prices, as well as for the production of characteristic starch syrups, glucose and maltose with utilization of S-amylose which is a by-product of the invention.

2. The films produced in accordance with the present invention are most suitable for food packaging and coating owing to their superiorities with respect to light transparency.

3. Water solubility of films can be varied according to the application areas where the products will be used by changing the L/S ratio of the amylose material.

4. As regards to film forming properties, processing can be carried out with ease because of the lower viscosity of the amylose, and in addition thinner films, in which air bubbles are absent, are obtainable, since amylose produced in accordance with the invention is superior to amylomaize starch.

5. Moreover, because film with desirable oil resistance, a very slight oxygen permeability and a high mechanical tensility is obtainable according to the invention, the films have optimal properties for packaging and coating powdered foods and frozen meat products. The above characteristics may be reviewed as follows.

With the employment of α-1,6-glucosidases the branched structures of amylopectin, 20 – 50 % present in the amylomaize starch to be used as a material for amylose films, were debranched to convert amylopectin into linear chain amylose. Films were formed from the enzymatically treated starch and intact amylomaize starch according to similar methods and their properties were compared giving the following results. In the case of films formed from enzymatically treated starch their viscosites were reduced, film formation procedure could be conducted with ease, and the transparency of the films increased to 90 – 95 % compared with the 50 % measured with films prepared from the natural amylomaize starch (intact starch). In addition the enzymatic treatment was found to have a tendency of increasing the physical tensility of films. Accordingly in films prepared with intact amylomaize starch, 30 – 40 % of amylopectin is present. By debranching amylopectin into S-amylose enzymatically following the methods described in the present invention, and when the content of S-amylose in the treated amylomaize starch is less than 50 %, films superior to those formed with non treated amylomaize starch are producible.

Amylose containing less than 50 % S-amylose and the remainder being L-amylose is produced by converting enzymatically amylopectin present in natural starch into S-amylose and then controlling the content of S-amylose to less than 50 % as described by varying the separating ratio of S-amylose and L-amylose. In other words the ratio of S-amylose/L amylose is controllable by adjusting the separation ratio of S-amylose and L-amylose or by mixing both amyloses to a desired ratio. According to the present processes, the amylopectin content of amylomaize starch is converted into S-amylose to give an amylose mixture, and thus the properties of the films produced with the mixture can be improved. Accordingly it is possible to increase the content of S-amylose higher than the maximum content of amylopectin in amylomaize starch and properties of films are variable by varying the content of S-amylose.

The processes according to the present invention now be described. Common corn starch and starch from root or tuber, such as sweet potato starch, potato starch and cassava starch, have low contents of L-amylose, whereas amylomaize starch has a high L-amylose content. Waxy maize starch is a unique starch from which only S-amylose is produced. For industrial applications amylose starches which have high L-amylose content were obtained by removing the amylopectin content present in the above varieties of starch or by simply purchasing commercial amylose starch. In the present invention, starch containing L-amylose abundantly is dispersed in water, adjusted to give a concentration of 10 – 30 %, liquefied by heating at 100 – 170°C, cooled rapidly, adjusted to pH 5 – 6, incubated with α-1,6-glucosidase at 40°–60°C for 20 – 45 hours, and then the starch reaction mixture is hydrolyzed almost completely into amylose by debranching the α-1,6-glucosidic linkages of the original starch. In this case the small amount of amylopectin of starch is hydrolyzed into amylose with D.P. of 20 – 30, which is equivalent to the chain length of branches of amylopectin, and amylose starch mixtures of L-amylose and S-amylose, in which L-amylose is predominating, is obtainable.

After converting the starch suspension into amylose with the employment of α-1,6-glucosidase, the resultant is fractionated into an L-amylose portion and an S-amylose portion utilizing the difference of molecular weights or degrees of polymerizatin between the two portion. More particularly amylose with a L/S ratio of 1:1 is obtained by precipitation upon gradual cooling to 40°C; S-amylose portion is obtained from the mother liquid. Moreover separation is attainable by precipitation with salts, such as magnesium sulphate, or by precipitation with hydrodynamic force.

The α-1,6-glucosidases used in the practice of the invention are obtainable by cultivating the following strains.

| | | |
|---|---|---|
| Escherichia intermedia | ATCC | 21073 |
| Pseudomonas amyloderamosa | ATCC | 21216 |
| Streptomyces diastatochromogenes | IFO | 3337 |
| Actinomyces globisporus | IFO | 12208 |
| Nocardia asteroides | IFO | 3384 |
| Micromonospora melanosporea | IFO | 12515 |
| Thermonospora viridis | IFO | 12207 |
| Actinoplanes philippinensis | KCC ACT- | 0001 |
| Streptosporangium roseum | KCC ACT- | 0005 |
| Agrobacterium tumefaciens | IFO | 3085 |
| Azotobacter indicus | IFO | 3744 |
| Bacillus cereus | IFO | 3001 |
| Erwinia aroideae | IFO | 3057 |
| Micrococcus lysodeikticus | IFO | 3333 |
| Mycobacterium phlei | IFO | 3158 |
| Serratia indica | IFO | 3759 |
| Staphylococcus aureus | IFO | 3061 |
| Lactobacillus brevis | IFO | 3345 |
| Sarcina albida | IAM | 1012 |
| Leuconostoc citrovorum | ATCC | 8081 |
| Pediococcus acidilactici | IFO | 3884 |
| Streptococcus faecalis | IFO | 3128 |
| Aerobacter aerogenes | ATCC | 8724 |
| Flavobacterium esteroaromaticum | IFO | 3751 |
| Acetobacter suboxydans | IFO | 3130 |
| Vibrio metschnikovii | IAM | 1039 |

The enzymes that are obtained from any of the above strains are applicable. The desirable incubation conditions are: temperature 45° – 55°C, incubation of 20 – 40 hours, and in most cases pH 5.0 – 6.5. Enzyme from Pseudomonas genes is most preferable for the production of amylose, since the amylose formed easily crystallizes and precipitates and separation can be performed with ease. In the case of this enzyme, the optimal pH ranges from 4.0 – 5.5, which is lower than in the cases of other enzymes. Because enzymes that are produced by genera of Lactobacillus and Actinomycetes are generally heat resistant and can be used at 50° – 60°C, these enzymes are suitable for industrial uses. The present processes will be described hereafter by examples which are only illustrative.

PROCESSES FOR FORMATION OF FILMS

Pure amylose separated from starch, especially from starch with high amylose contents, contains 90 – 95 % L-amylose. Pure amylose separated from common starch by careful fractionation contains over 90 % L-amylose and is preferable as a material for the formation of films. On the contrary amylose with D.P. of 20 – 30 predominates in amylose produced by hydrolyzing waxy corn starch or amylopectin. This amylose has a low film forming property and is difficult to form into film unless utilizing other methods.

Amylose preparations suitable for the formation of films are obtained by admixing the above mentioned L-amylose or controlling the separation procedure in order to prepare material mixtures with S-amylose contents of (1) 5 %, (2) 10 % or (3) 20 % or (4) 50 %. Any of the previously known methods are applicable for the formation of films: Forming and drying aqueous amylose solution into films, or forming alkali amylose solution into films and then solidifying the films in acidic bath, or forming and drying an organic solvent solution, using formamide etc., as solvents, into films are some of the methods. A suitable plasticizer is added to the amylose. The plasticizer is preferably a polyalcohol such as glycerol, propylene glycol, sorbitol, maltitol, etc. Processes for formation of films with alkali solutions prepared from the various varieties of starch are as follows. Each material amylose is dissolved in 1 – 2 N—NaOH to give a concentration of 20 %, solidified in a sulphuric acid bath, submerged in a glycerin solution, dried, and then equilibriated at relative humidity of 60 %. The results obtained by comparison tests on the properties of equilibrated films and those of amylomaize starch (amylose content 60 %) films formed by a similar method are shown in Table 1.

Table 1

| Sample | (1) | (2) | (3) | (4) | (5) Amylomaize |
|---|---|---|---|---|---|
| S-amylose (%) | 5 | 10 | 20 | 50 | Amylopectin 40% |
| Film forming property | excellent | excellent | good | good | fair |
| Water Solubility | cold water insoluble | cold water insoluble | slightly swells in cold water | slightly swells and dissolves in cold water | cold water insoluble |
| Light transparency (0.15 mm. thickness) | | | | | |

Table 1-Continued

| Sample | (1) | (2) | (3) | (4) | (5) Amylomaize |
|---|---|---|---|---|---|
| E 720 m | 92 | 93 | 93 | 94 | 52 |
| 420 m | 81 | 84 | 83 | 82 | 49 |
| Tensile strength (p.s.i.) | 8,700 | 8,600 | 8,400 | 8,100 | 8,000 |
| Elongation rate (%) | 18 | 15 | 16 | 12 | 14 |
| Gas permeability $O_2$ | 0 | 0 | 0 | 0 | 0 |

As apparent from Table 1, the properties vary in accordance with the content of S-amylose present in the films. Decrease of viscosity in the film material solution corresponds with the increase of the amount of short chain molecules, facilitates liquidizing and in addition facilitates removal of air bubbles, which facilitates the production of transparent films. Also in the case of (1), liquidization of course can be performed with great ease and the resultant viscosity is lower than amylomaize starch. When S-amylose content exceeds 50 %, film forming property declines, the amylose becomes difficult to form into films. Because the water swelling property and water solubility increase with the increase of S-amylose content, it is necessary to vary the composition of the amylose according to applications. Highly soluble films are suitable for producing small bags for beverages such as instant coffee, instant black tea, and other powdered beverages.

The films according to the present processes have an excellent light transparency of nearly 100 % compared to the commercial amylomaize starch films which have a light transparency of about 50 %. In addition the said films have a relatively shiny gloss. Because their oxygen permeabilities are negligible, the films have the same applications which amylomaize starch films have. As shown in Table 1, the tensile strenghts decrease in accordance with the increase of S-amylose content. The fact that the mechanical strength decreases with the increase of S-amylose content is inevitable. Especially as the S-amylose content approaches the 50 % level a tendency for a sudden decline in the tensilities is apparent. However, it is still more desirable then the sample (5). Thus, it is clear that the tensility and light transparency of films can be improved to higher levels than those of commercial films by using amylose starch, in which the main constituent of starch is L-amylose. The films have excellent gas permeability and oil resistance which are equal to those of commercial amylomaize starch films. To increase the S-amylose content to 20 – 40 % of starch is a preferred method to improve the water solubility of the films.

For the production of films in accordance with the present processes, amylose starch with a L-amylose content of over 50 % is required. Therefore amylose starch which is produced from common starch (amylose content 20 – 25%) and contains as its main constituent S-amylose, has an excessive amount of S-amylose and is not a suitable film forming material. However since this linear chained and short molecular amylose starch consists of only α-1,4 linked molecules and branched portions are absent, such amylose starch can be easily hydrolyzed by the use of α-amylase and β-amylases. Accordingly production of glucose with a D.E. of 100 % using glucoamylases, and production of 100 % pure maltose using β-amylases are possible. In addition by subjecting such amylose starch to the actions of α-amylases, other amylases or acids at desirable degrees, the starch converts into low molecular maltoligosaccharides, and thus the starch will become a raw material for the production of starch syrups in which glucose is absent, or low viscosity starch syrups in which amylopectin-like branched molecules are absent or specific and high quality starch syrups. Therefore the fact that both amylose films and starch syrups can be manufactured most economically, through the production of relative products are points that deserve special attention. In order that the invention may be well understood the following examples are given by way of illustration only. All percentages and parts are by weight dry basis unless otherwise stated.

EXAMPLE 1-1

Processes for the Preparation of Material Amylose

A 25 % aqueous starch suspension was prepared after washing amylomaize starch (amylose content 70 %) in water. The suspension was pumped continuously into a cylindrical gelatinizer equipped with a multi-bladed-agitator and gelatinized by charging raw steam into the gelatinizer and heating the suspension rapidly to 165°C. After allowed standing at 165°C for 10 minutes, the gelatinized suspension was injected into a vacuum flash cooler where it was cooled rapidly to 60°C, and induced into a rotary coil cooler where it was cooled. Then to the resultant was added 30 units of Escherichia enzyme per gram starch at 50°C under stirring conditions, and allowed standing at pH 6.0, 45° – 50°C for 1 hour. The resultant was transferred into a reaction tank and incubation was carried out at 45° – 50°C by stirring slowly, and the viscosity of solution decreased. Following inactivation by heating to 100°C, the solution was cooled to 50°C, then gradually to 10°C. The precipitated amylose was centrifuged. The second centrifuged solution was suspended with one-half part of water and a bright white precipitate was obtained. The precipitate was dried by aeration or in vacuum. Yield was 80 %. Mother liquid and washing were condensed to a concentration of 10 %, and reprecipitated and 12 % L-amylose was obtained. The mixture of both products had a purity of 73 %.

EXAMPLE 1-2

Process for the Production of Pure Amylose

As described in Example 1-1, 20 % aqueous starch suspensions were prepared from amylomaize starch after washing then the suspensions were gelatinized at 160°C, cooled in a cooling tank and its temperature and pH were adjusted to 50°C and pH 5.5. To the gelatinized solution was added 25 units of salted out enzyme per gram starch obtained from culture of Pseudomonas amyloderamosa. After holding for 1 – 2 hours, it was pumped into a batch type reaction tank, incubated under stirring conditions for 25 hours, and then cooled slowly or allowed cooling. Part of the formed amylose began precipitation during the reaction procedure. Amylose starch which deposited upon allowed cooling was centrifuged. Mother liquid was condensed to less than one-half volume and the amylose which precipitated similarly was collected. yield was about 93 % (solid basis). The product had a moisture content of 51%, and could be treated with ease. Pure amylose was obtained by drying and pulverization following suspending and washing the said product in one-half part of water.

EXAMPLE 1-3

A 15 % starch suspension prepared with amylomaize starch was dispersed and gelatinized by heating to 120°C under stirring conditions for 20 minutes and was enzymatically treated similarly as in Example 1-1. Incubation was discontinued after 30 hours. The precipitated amylose was separated, washed and dried to give a dry product. The yield was 80 %, α-amylose content 85 %. The product will be referred to as 3 - 2 hereinafter.

EXAMPLE 1-4

Processes for the Production of L-amylose (4-L) and S-amylose (4-S)

As an example of root and tuber starch, potato starch or sweet potato starch was employed. A 20 % suspension was prepared from the starch. To the suspension was added magnesium sulphate and the final concentration of starch was adjusted to 15 %, and that of magnesium sulphate to 13 % with suitable amount of water and its pH was adjusted to 6.5. The starch solution was heated to 120°C by a continuous heating and stirring equipment, and pumped into a holding tank where it was heated and dispersed for about 18 minutes. Then a 10 % magnesium sulphate solution was cooled to 20°C. The formed amylose precipitate was centrifuged and washed with water sufficiently. To the supernatant liquid was added magnesium sulphate to give a magnesium sulphate concentration of 13 % and from it amylopectin was separated at 20°C and washed with water. The yield of amylose was 17 % per raw material starch. Purity of the amylose was assayed by the iodine method, which showed the purity was 95 % and had a mean D.P. (degree of polymerization) of approximately 300. The yield of amylopectin portion was 75 %.

In order to convert the above amylose and amylopectin slurry into pure linear chain amylose, these were dispersed at 110° – 160°C, cooled rapidly to 50°C, incubated with an α-1,6-glucosidase for 30 hours. The resultant mixture solution was allowed cooling overnight 10°C. The deposited precipitate was centrifuged, washed in cold water and thus pure amylose was obtained.

The conditions for reaction are listed in Table 2. Yields were calculated by adding deposits which were obtained from the mother liquid following concentrating and cooling, to the S-amylose portion. Yield of the L-amylose portion and the S-amylose portion were 15 % and 75 % respectively.

Table 2

| Reaction condition | Amylose portion | Amylopectin portion |
| --- | --- | --- |
| Dispersion concentration (%) | 10 | 15 |
| Dispersion temperature (°C) | 160 | 120 |
| Cooling temperature (°C) | 50 | 50 |
| pH | 5.5 | 5.5 |
| Source of enzyme added | Pseudomonas | Pseudomonas |

Table 2-Continued

| Reaction condition | Amylose portion | Amylopectin portion |
| --- | --- | --- |
| Enzyme activity (unit/g. starch) | 10 | 30 |
| Incubation period (hr.) | 30 | 35 |

The obtained product was pure amylose, the L-amylose portion of which had a 3 – 5 % content of S-amylose (4-L). The remainder was S-amylose with a mean D.P. of 30 (4-S).

EXAMPLE 1-5

Process for the Production of L-amylose (5-L) and S-amylose (5-S) from Amylomaize Starch In this Example amylomaize starch which had a amylose content of 70 % was used as a starting material. The procedures were performed as outlined in Example 1-1. However since liquefaction of starch proved somewhat difficult in the initial stage, the starch suspension was heated to 130° – 170°C under stirring conditions. Immediately upon completion of dispersion the dispersed solution was cooled rapidly to 20°C. Precipitation was performed with magnesium sulphate (concentration 10 %) and at a starch concentration of 10 %. The precipitate was centrifuged and washed with water. Subsequently, the concentration of magnesium sulphate was increased to 13 % as in Example 1-4 and the amylopectin which precipitated at 20°C was removed. The yield of amylose portion, and amylopectin portion were 65 % and 30 % respectively. The purity of amylose was 96 %.

The above separated portions of starch were heated and gelatinized as in Example 2, adjusted to pH 5.5, 50°C. To the gelatinized amylose portion was added 10 units of α-1,6-glucosidase per gram starch and to the amylopectin portion 20 units of α-1,6-glucosidase per gram starch. The duration of incubation was 40 hours. The reaction mixture was treated as in Example 2. L-amylose (5-L) 62 %, and S-amylose (5-S) 30 % were obtained after separation of precipitates. S-amylose content of 40 % was present in the L-amylose.

EXAMPLE 1-6

Process for the Separation of Amylose Mixture Obtained From Potato Starch

An example of root and tuber starch is illustrated using potato starch. A potato starch slurry was adjusted to a concentraton of 25 % and pH 5.5 and dispersed by heating to 100° – 170°C under stirring conditions. The complete dispersion was cooled rapidly to 50°C to prevent retrogradation. At a concentration of 10 %, and pH 6.0, 30 units of α-1,6-glucosidase (enzyme of Pseudomonas) per gram starch was added to the dispersion. The dispersion was then incubated at 50°C for 35 hours. Following the reaction the reaction mixture solution was allowed cooling. Immediately upon formation of precipitate the mixture was centrifuged, and washed with water. Thus 21 % of amylose (6-L) was obtained. After allowed cooling, the mother liquid was centrifuged and S-amylose was collected similarly. The second mother liquid was condensed under reduced pressure to a concentration of 15 % and cooled. The formed precipitate was collected as S-amylose (6-S).

The yield of S-amylose was 75 %. The L-amylose content in 6-L was about 90 %. In this Example each separated amylose obtained by cooling the enzymatically reacted solution to 15°C and 10°C had S-amylose contents of about 25 % and 45 % respectively. The obtained amylose are applicable as film material. The products were defined as $6L_2$ and $6L_3$.

EXAMPLE 1-7

Process for the Production of High Purity L-amylose (7-L) and S-amylose (7-S) From Root and Tuber Starch Tapioca, as an example of root and tuber starch, was treated similarly as in Example 1-6 at a concentration of 25 %. The resultant complete dispersion was cooled rapidly and formed into a liquefied solution with a concentration of 10 %. At pH 5.5, 50°C, 30 units of enzyme produced by Pseudomonas per gram starch was added, stirred and mixed sufficiently. Then incubated at 45°C for 40 hours. Following incubation, 0.4 volume percent of n-butanol was added to the reaction solution and heated. After dissolving precipitate the solution was cooled slowly. Precipitate which formed after 10 hours was centrifuged, washed with cold water. Thus L-amylose (7-L) 16 % (dry basis) was obtained. The 7-L contained 90 % L-amylose. The mother liquid and washing solution (supernatant liquid) was condensed to give a concentration of 15 % and allowed cooling. Precipitate was separated and S-amylose (7-S) was obtained.

EXAMPLE 1-8

Process for the Production of L-amylose (8-L) and S-amylose (8-S) From Cereal Starch Common corn starch was used as an example of cereal starch. Since in this case liquefaction and dispersion were attended with difficulties, the concentration was reduced to less than 20 % and the temperature elevated to 165°C. The starch suspension was heated and dispersed with stirring under the above condition. Subsequent processings of the solution were performed as described in Example 1-6; cooled rapidly to 50°C added 30 units of enzyme such as produced by Lactobacillus per gram starch at pH 6.0, and incubated at 50°C for 40 hours. The resultant hydrolyzate was gradually cooled at a concentration of 10 %, at around 30°C when an increase of precipitated crystals was observed, the hydrolyzate was centrifuged and washed with water. In the amylose produce (8-L) L-amylose predominated, a S-amylose content of odd percentage being present. By washing precipitate obtain by allowing the filtered solution to cool, and precipitate obtain by concentration and cooling the mother liquid, S-amylose (8-L) was obtained.

EXAMPLE 2-1

Process for the Production of Amylose Films 25 parts of amylomaize starch (amylose content 70 – 75 %) was admixed gradually to warm mixture comprising 6 parts NaOH, 0.1 part of $Na_2SO_4$, and 68.9 parts water, then dissolved sufficiently. After removing the air bubbles by degassing or by standing, the mixture was cast thinly on a glass plate to form film, then was coagulated by submersion in acidic coagulants ($NaSO_4$ 21 % + $H_2SO_4$ 13.0 % + $H_2O$ 66 %) for 10 minutes. Subsequently the film was submerged in running water (25°C) to wash for 20 minutes. After submersion in 13 % glycerin solution for 10 minutes, the film was dried at 30°C. The film had small bubbles and an inferior transparency; light transparency was a little over 50 %. Although a relatively elastic film was obtained, it became brittle within several weeks and its quality deteriorated.

EXAMPLE 2-2

Amylose Film From Enzymatically Treated Starch

Amylose (2-L and 3-L) was treated similarly as in Example 2-1. Since the viscosity of the amylose solution was low, 30 units of amylose was added to the solution and dissolved. The following procedures were the same as that of Example 2-1, thus a film with a thickness of 0.1 - 0.15 m/m was obtained. The characteristics of the film were apparent at first sight; it showed neither white turbidity nor bubbles as in the cases of commercialized amylose films, had a transparency and its surface had a favorable gloss. One attribution to these characteristics is the easiness to form degassed film, due to the complete solubility, low viscosity of the material amylose solution. In addition, formation of films thinner than 0.1 m/m is possible. The light transparency of the films is 96 %, tensile strength 220 $kg/cm^2$ whereas amylomaize starch film is, 190 $kg/cm^2$. Flexible and desirable films are obtainable. Heat sealing is also possible.

EXAMPLE 2-3

Process for the Production of Amylose Film (L-amylose Content 90 %)

The L-amylose (purity 90 %) such as L-amylose (5-L) and (7-L) was added to an alkali solution comprising 6 g. NaOH, 6 g. glycerin 68.9 g. water to be a concentration of 20 %. The temperature of the solution was adjusted to 30°C. The solution was filtered with warm glass (fibre) filter, allowed standing at 30 °C overnight, and degassed. Thus the solution was cast on glass plate uniformly and film was formed. The film was solidified by submerging it in a coagulant solution (21 %, $NaSO_4$, 13 % $H_2SO_4$) for 10 minutes and washed in running water for 20 minutes. Subsequently the film was submerged in a 13 % glycerin solution for 10 minutes and dried at 30°C. The resultant film had a desirable gloss, an absorbance of visible light within 5 %, and a high tensile strength (240 $kg/cm^2$). Whereas films produced from amylomaize starch by the same method had a light absorbance of 55 %, the present film has a higher transparency, and is superior in respect of tensile strength and in addition has a desirable flexibility. The lower viscosity of alkali solution and facilitation of degassing and production of films with uniform thickness are additional characteristics. The film has a lower hygroscopicity and desolves slowly in water.

EXAMPLE 2-4

Process for the Production of Amylose Films

An amylose solution (concentration 20 %) was prepared from L-amylose, 6-, 7-, and 8-L, under the same conditions as that of Example 2-2, then formed into a film and dried.

Light transparency oxygen permeability and oil resistance were nearly similar to the film of Example 2-3. Although a little difference were noted in its hygroscopicity and flexibility, the film had a superior quality.

EXAMPLE 2-5

Process for the Production of Amylose Films.

L-amylose of 6-L, and 8-L (Example 1-6, and 1-8) and S-amylose of 6-S (Example 1-6) were employed.

An amylose mixture composing 8 % S-amylose and 80 % L-amylose was prepared. The mixture was treated by the same method as that of Example 2-4, with the exception that the mixture was treated at an amylose concentration of 25 %, because the alkali solution had a relatively lower viscosity. Films were obtained by following the same procedures of coagulation, washing in water, and drying. Tests on the films resulted preferably by exhibiting no significant differences in its light transparency and oxygen permeability to those of the product in the preceeding example. Increase of the amylose concentration in the alkali solution was possible. Coagulation and drying procedures of the film desirably were also possible, but tensile strength was decreased a little. The film showed a slight increase of hygroscopicity and a quicker water swelling tendency.

EXAMPLE 2-6

The Production of Amylose Films

Amylose mixtures with L-amylose content of 60 % and 50 % were prepared by admixing L-amylose (6-L) and S-amylose.

Each of the mixtures was dissolved in alkali, coagulated with acidic coagulant solution and formed into film. The film was compared similarly resulting with a relatively higher solubility, higher water swelling property and a tendency of a faster dessolving velocity. The film was found preferable for different applications.

Decrease of the L-amylose content deteriorates tensile strength of films.

EXAMPLE 2-7

The Production of Amylose Films

6-$L_2$, and 6-$L_3$ were used as material amylose. Amylose was prepared into alkali solution and formed into film following the same methods as those of the preceeding Example. Comparison tests resulted in attainment of a film which a quality near to those of the films of Example 2-5 and 2-6.

EXAMPLE 2-8

One part of amylose (L-amylose content 50 – 95 %) treated by the same methods as those of Example 2 was suspended in 10 parts of water. The suspension was dispersed sufficiently by heating at 100° – 120°C in an autoclave then 0.5 parts of sorbitol was added and dissolved sufficiently. The solution was cast uniformly on a metal plate and dried at 90° – 100°C quickly. A film with a high elasticity, high folding property, and desirable transparency was obtained. In addition the plasticizer used displayed its effectiveness by showing no change in quality even after 4 weeks.

Whereas films prepared with glycerin showed deterioration.

EXAMPLE 2-9

To 100 parts of a 10 % aqueous amylose solution prepared with amylose of Example 2 was added 3 parts of maltitol. The mixture was heated to 140° – 150°C. The dissolved solution was cast on a metal plate in a thickness of 0.2 m/m. The film dried within 30 seconds by heating the plate from below at 95°C and applying warm air (30°C) to the surface of the film. Employment of the method attributed to drying before deterioration began. The thus obtained films had desirable transparency, higher tensile strength, higher elasticity, however its elongation relatively low.

What we claim is:

1. A process for the production of amylose films comprising forming said films from amylopectin-free amylose having a content of short chain amylose less than 50% obtained by hydrolyzing starch with $\alpha$-1,6-glucosidase from the species Pseudomonas amyloderomosa and with the addition of a plasticizing amount of suitable plasticizer.

2. A process according to claim 1 wherein the amylose obtained by hydrolyzing starch with $\alpha$-1,6-glucosidase from the species Pseudomonas amyloderomosa has a content of long chain amylose with D.P. over 100.

3. A process according to claim 1 wherein to make said amylose, common starch is fractionated into amylose and amylopectin, then both are hydrolyzed with $\alpha$-1,6-glucosidase from the species Pseudomonas amyloderomosa into amylose and are mixed to control the content of long chain amylose present in the amylose.

4. A process according to claim 1 wherein said plasticizer is glycerol, propylene-glycol or sorbitol.

5. Amylose films produced in accordance with the process of claim 1.

* * * * *